United States Patent
Chiang et al.

(10) Patent No.: US 11,307,108 B2
(45) Date of Patent: Apr. 19, 2022

(54) TORSION ADJUSTMENT DEVICE

(71) Applicant: PEGATRON CORPORATION, Taipei (TW)

(72) Inventors: Shiuan-Chai Chiang, Taipei (TW); Li-Jin Ji, Taipei (TW); Jen-Hui Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 317 days.

(21) Appl. No.: 16/674,923

(22) Filed: Nov. 5, 2019

(65) Prior Publication Data

US 2020/0182719 A1    Jun. 11, 2020

(30) Foreign Application Priority Data

Dec. 11, 2018   (CN) .......................... 201811508282.0

(51) Int. Cl.
*G01L 5/00*    (2006.01)
*G01L 5/24*    (2006.01)

(52) U.S. Cl.
CPC .............. *G01L 5/24* (2013.01); *G01L 5/0066* (2013.01)

(58) Field of Classification Search
CPC ................................ G01L 5/24; G01L 5/0066
See application file for complete search history.

(56) References Cited

U.S. PATENT DOCUMENTS

| | | | | |
|---|---|---|---|---|
| 2,437,330 | A * | 3/1948 | Mullgardt | B64C 29/0033 244/48 |
| 4,787,148 | A * | 11/1988 | Myer | G01B 3/18 33/814 |
| 6,012,538 | A * | 1/2000 | Sonobe | B62M 6/45 180/206.3 |
| 8,316,959 | B2 | 11/2012 | Roehm | |
| 9,017,198 | B2 * | 4/2015 | Hoebel | B60K 7/00 474/139 |
| 2002/0065525 | A1 * | 5/2002 | Perry | A61B 17/2909 606/139 |
| 2018/0223730 | A1 * | 8/2018 | Suda | F02B 75/04 |

FOREIGN PATENT DOCUMENTS

| | | |
|---|---|---|
| CN | 2836998 | 11/2006 |
| TW | 154762 | 3/1991 |
| TW | 239353 | 1/1995 |
| TW | 410715 | 11/2000 |
| TW | 201531636 | 8/2015 |

* cited by examiner

*Primary Examiner* — Max H Noori
(74) *Attorney, Agent, or Firm* — J.C. Patents

(57) ABSTRACT

The present disclosure provides a torsion adjustment device, including a torsion receiving element, a force transmission module and an elastic force module. The torsion receiving element includes a transmission shaft coupled to a torsion mechanism. The transmission shaft is driven by a torsion applied by the torsion mechanism to rotate. The force transmission module includes a gear set and a gear turntable meshing with the gear set, and the transmission shaft is coupled to the gear set to drive the gear set to rotate by the torsion. The elastic force module includes an elastic element and a plurality of force-bearing balls. The elastic element is configured to generate an elastic force. The force-bearing balls abut between the elastic element and the gear turntable and mesh with the gear turntable. When the torsion is greater than the elastic force, the gear turntable is disengaged from the force-bearing balls and rotated.

10 Claims, 5 Drawing Sheets

TORSION ADJUSTMENT DEVICE

CROSS-REFERENCE TO RELATED APPLICATION

This application claims the priority benefit of China application serial no. 201811508282.0, filed on Dec. 11, 2018. The entirety of the above-mentioned patent application is hereby incorporated by reference herein and made a part of this specification.

BACKGROUND

Technical Field

The embodiment of the present disclosure relates to a power adjustment device, and more particularly relates to a torsion adjustment device.

Related Art

A torsion mechanism and other power mechanisms are tools often used by current machinery manufacturers, and are usually used for locking or loosening screws or nuts. Therefore, a motor driving and other means must be used to achieve a high torsion output. The size of the torsion output of the torsion mechanism and the operation time involve the properness and the accuracy of workpiece locking, such as a not-in-place locking operation (the torsion is too small or the operation time is short), excessive tightening (the torsion is too large or the operation time is too long) and other problems on proper matching between the torsion and the time in operation. When such torsion mechanism is used to rotate a screw or a nut, if the torsion of the torsion mechanism is unable to effectively control, the problems of insufficient locking degree or thread breakage caused by extremely high tightness during rotation will be often caused. Therefore, for the torsion mechanism, the torsion output condition thereof needs to be tested at first to achieve better application effect.

In view of this, in the industry, a commercially available torsion meter is generally used to calculate a rotation torsion that the torsion mechanism needs to output. However, there are still many problems in this way. For example, an additional torsion meter is not favorable for operations inside a machine, and an adjustment and calibration process is also cumbersome and time consuming. Furthermore, data between the torsion meter and a torsion setting system cannot be connected. Therefore, it is still very inconvenient in the torsion adjustment and calibration operation in the current industry.

Besides, existing power tools usually have no torsion adjustment device. Therefore, for a part requiring a precise locking torsion, a manual torsion wrench needs to be used to perform a precise locking action, which causes a waste of human resources and also relatively prolongs the working time and cannot improve the working efficiency.

SUMMARY

The present disclosure is directed to a torsion adjustment device, which may simplify a torsion adjustment and calibration process and then improve the torsion adjustment and calibration efficiency.

According to an embodiment of the present disclosure, a torsion adjustment device includes a torsion receiving element, a force transmission module and an elastic force module. The torsion receiving element includes a transmission shaft coupled to a torsion mechanism. The transmission shaft is driven by a torsion applied by the torsion mechanism to rotate. The force transmission module includes a gear set and a gear turntable meshing with the gear set, and the transmission shaft is coupled to the gear set to drive the gear set to rotate by the torsion. The elastic force module includes an elastic element and a plurality of force-bearing balls. The elastic element is configured to generate an elastic force. The plurality of force-bearing balls abut between the elastic element and the gear turntable and mesh with the gear turntable. When the torsion is greater than the elastic force, the gear turntable is disengaged from the plurality of force-bearing balls and rotated.

According to an embodiment of the present disclosure, the gear set includes a center gear coupled to the transmission shaft and a plurality of outer ring gears meshing with the center gear. The gear turntable is sleeved outside the gear set and meshes with the plurality of outer ring gears.

According to an embodiment of the present disclosure, the gear set is an epicyclic gear set; the center gear is a sun gear, and the outer ring gears are planet gears.

According to an embodiment of the present disclosure, the gear turntable includes a plurality of grooves to respectively mesh with the plurality of force-bearing balls, and when the torsion is greater than the elastic force, the plurality of force-bearing balls press the elastic element to cause the plurality of force-bearing balls to be disengaged from the grooves.

According to an embodiment of the present disclosure, the elastic force module further includes a bottom plate, a pressing plate and a plurality of elastic force adjustment columns. The elastic element abuts between the bottom plate and the pressing plate. The plurality of elastic force adjustment columns are arranged on the bottom plate and pass through the pressing plate to adjust a distance between the bottom plate and the pressing plate through the plurality of elastic force adjustment columns, so as to adjust the elastic force.

According to an embodiment of the present disclosure, the elastic force module further includes a plurality of nuts. The plurality of elastic force adjustment columns are a plurality of studs, and the plurality of nuts are respectively sleeved outside the plurality of studs and abut against the pressing plate, so as to adjust the distance between the bottom plate and the pressing plate by rotating the nuts.

According to an embodiment of the present disclosure, the torsion adjustment device further includes a rotatably locked assembly. The transmission shaft is coupled to the rotatably locked assembly, so as to lock the rotatably locked assembly via rotation.

According to an embodiment of the present disclosure, the torsion adjustment device further includes a base and a scale column arranged on the base. The rotatably locked assembly is arranged on the base, and elastic force scales are marked on the scale column, so as to mark the elastic force.

According to an embodiment of the present disclosure, the elastic element is a compression spring.

According to an embodiment of the present disclosure, the torsion adjustment device further includes a torsion sensor, coupled to the transmission shaft to sense the torsion.

Based on the above, the torsion receiving element of the torsion adjustment device according to the embodiment of the present disclosure is suitable for being butted with the torsion mechanism to receive and transmit the torsion provided by the torsion mechanism and drive the transmission shaft thereof to rotate, and the transmission shaft is coupled to the rotatably locked assembly, so that the rotatably locked assembly may be locked through the rotation of the transmission shaft. Furthermore, the torsion adjustment device may determine whether a torsion value of the torsion mechanism reaches a preset critical value by the force-bearing ball of the elastic force module and the gear turntable of the force transmission module are in mesh or not, and then the torsion of the torsion mechanism may be adjusted and calibrated. Therefore, the torsion adjustment device of the embodiment of the present disclosure may easily know whether the torsion provided by the torsion mechanism reaches a critical value without using an additional torsion meter, and may adjust and calibrate the torsion hereby (for example, the torsion, exceeding the critical value, of the torsion mechanism is turned down), thus simplifying the torsion adjustment and calibration process and then improving the torsion adjustment and calibration efficiency.

BRIEF DESCRIPTION OF THE DRAWINGS

The accompanying drawings are included to help further understand the content of the present disclosure, and the accompanying drawings are incorporated into the specification and constitute a part of the specification. The accompanying drawings describe the embodiments of the content of the present disclosure, and are used together with the descriptions to disclose the principles of the content of the present disclosure.

DETAILED DESCRIPTION

Figure 1:
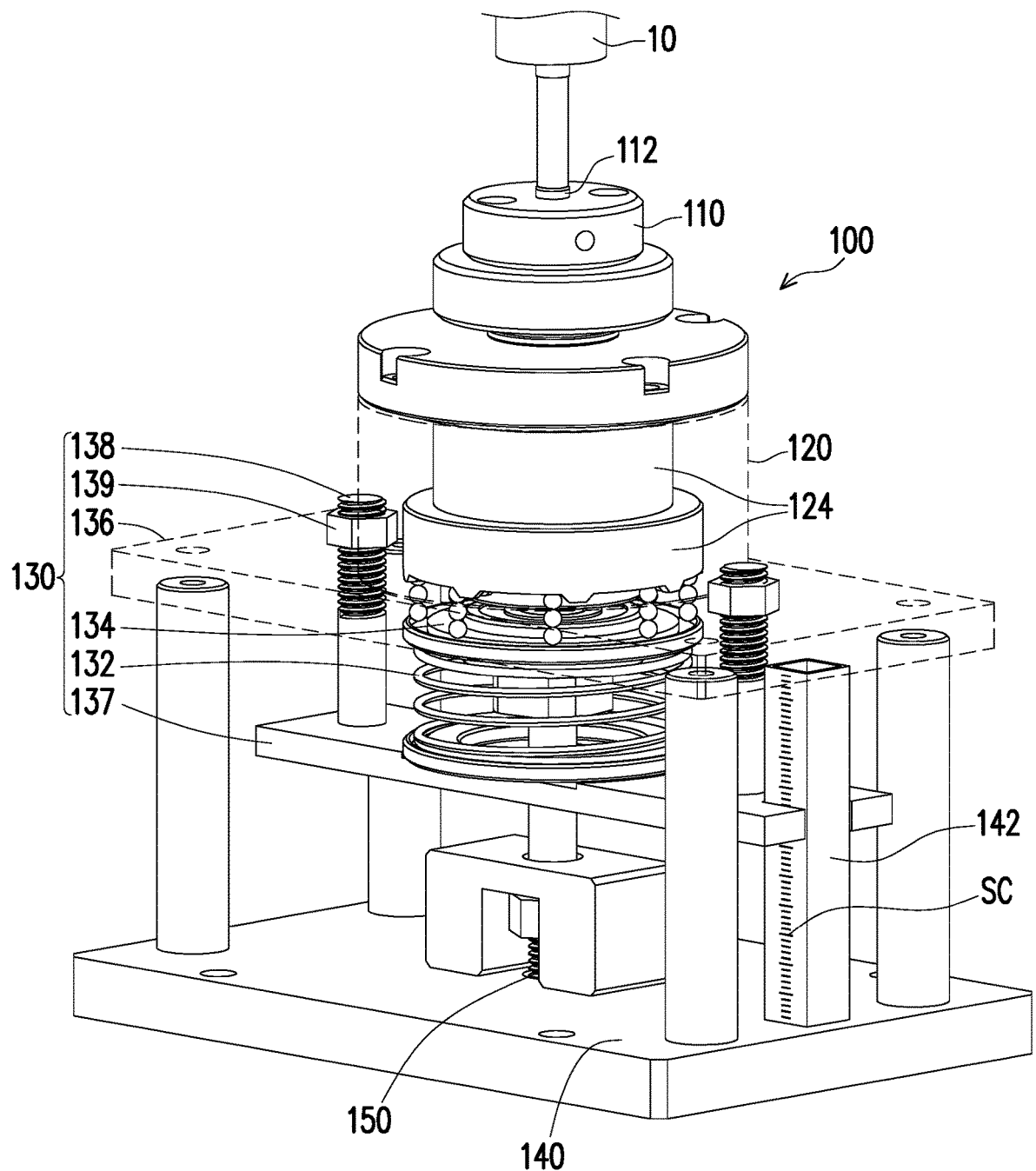
FIG. 1 is a three-dimensional schematic diagram of a torsion adjustment device.

The foregoing and other technical contents, features and effects of the embodiments of the content of the present disclosure will be clearly presented in the detailed description of the embodiments in combination with accompanying reference drawings. The directional terms "upper", "lower", "front", "back", "left", "right" and the like mentioned in the present disclosure merely refer to the directions as seen in the accompanying drawings. Therefore, the directional terms as used herein are intended to illustrate rather than limit the content of the present disclosure. Descriptions are made in the accompanying drawings with reference to exemplary embodiments of the content of the present disclosure and examples of the exemplary embodiments in detail. If possible, same reference numerals of elements are used to indicate same or similar parts in the accompanying drawings and descriptions.

Figure 2:
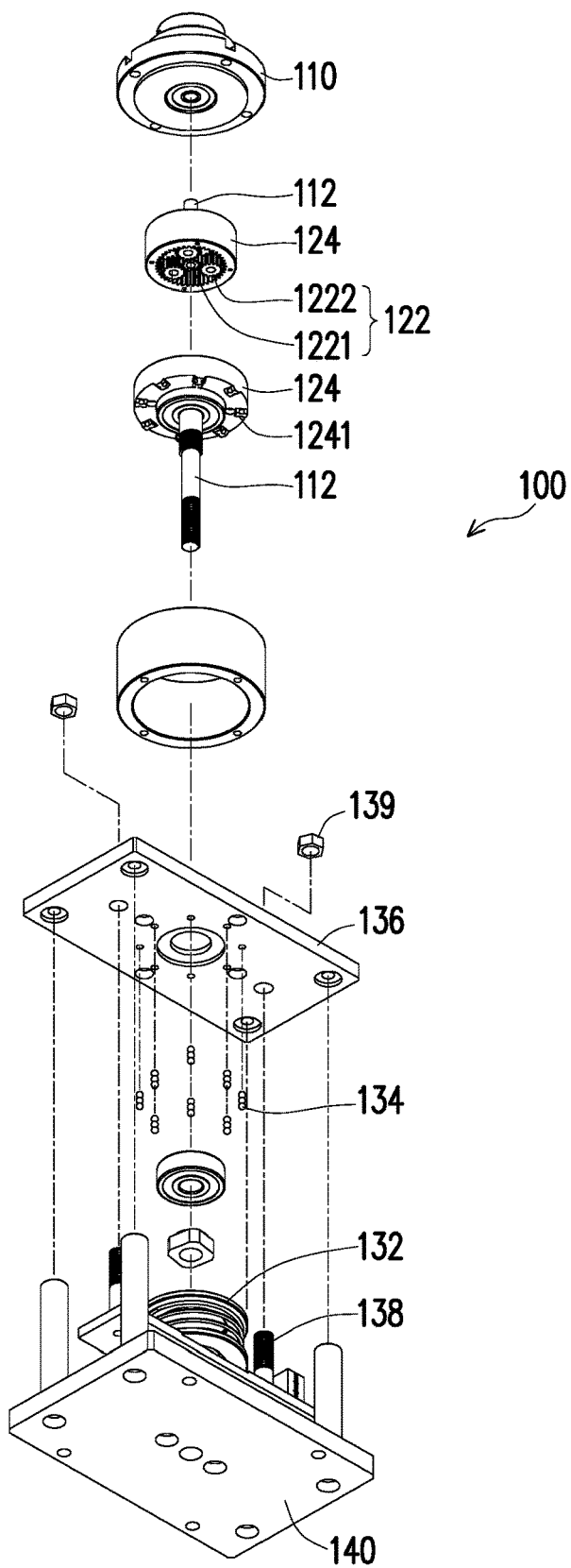
FIG. 2 is an exploded schematic diagram of a torsion adjustment device.

FIG. 1 is a three-dimensional schematic diagram of a torsion adjustment device, and FIG. 2 is an exploded schematic diagram of a torsion adjustment device. It should be noted that the illustrations of the present embodiments are merely schematic. In order to clearly show a structural configuration inside the torsion adjustment device 100, part of assemblies such as a shell, a cover body or a sleeve of the torsion adjustment device 100 may be omitted. Referring to FIGS. 1 and 2 at the same time, in the present embodiment, the torsion adjustment device 100 includes a torsion receiving element 110, a force transmission module 120 and an elastic force module 130. The torsion receiving element 110 may be coupled to the torsion mechanism 10 and is used to receive and transmit a torsion provided by the torsion mechanism 10. In some embodiments, the torsion mechanism 10 may be any proper power device, which may generates a torsion in a motor driving mean or through highly compressed air. In the present embodiment, the torsion receiving element 110 may include a transmission shaft 112 coupled to the torsion mechanism 10, such that the torsion receiving element 110 is rotated by the torsion driven by the torsion mechanism 10 on the transmission shaft 112.

In some embodiments, the torsion adjustment device 100 may include a plurality of torsion receiving elements 110 designed for different torsion mechanisms 10, so that the torsion adjustment device 100 may be widely applied to the torsion mechanisms 10 in various different forms, so as to increase the application range and the use elasticity of the torsion adjustment device 100. In some embodiments, the transmission shaft 12 may extend through the axis of the whole torsion adjustment device 100 (for example, the axis of the force transmission module 120 and the axis of the elastic force module 130), and is coupled to a rotatably locked assembly 150 arranged on a base 140 of the torsion adjustment device 100. In such configuration, the transmission shaft 112 is driven by the torsion provided by the torsion mechanism 10 to rotate, and locks the rotatably locked assembly 150 via the rotation. For example, the rotatably locked assembly 150 may be a screw. In some embodiments, the transmission shaft 112 may be formed by a plurality of shaft levers connected to each other, so as to transmit the torsion provided by the torsion mechanism 10 to the rotatably locked assembly 150 through the various shaft levers, but the present embodiment is not limited thereto. In other embodiments, the transmission shaft 112 also may be an integrated transmission shaft lever.

Figure 3:
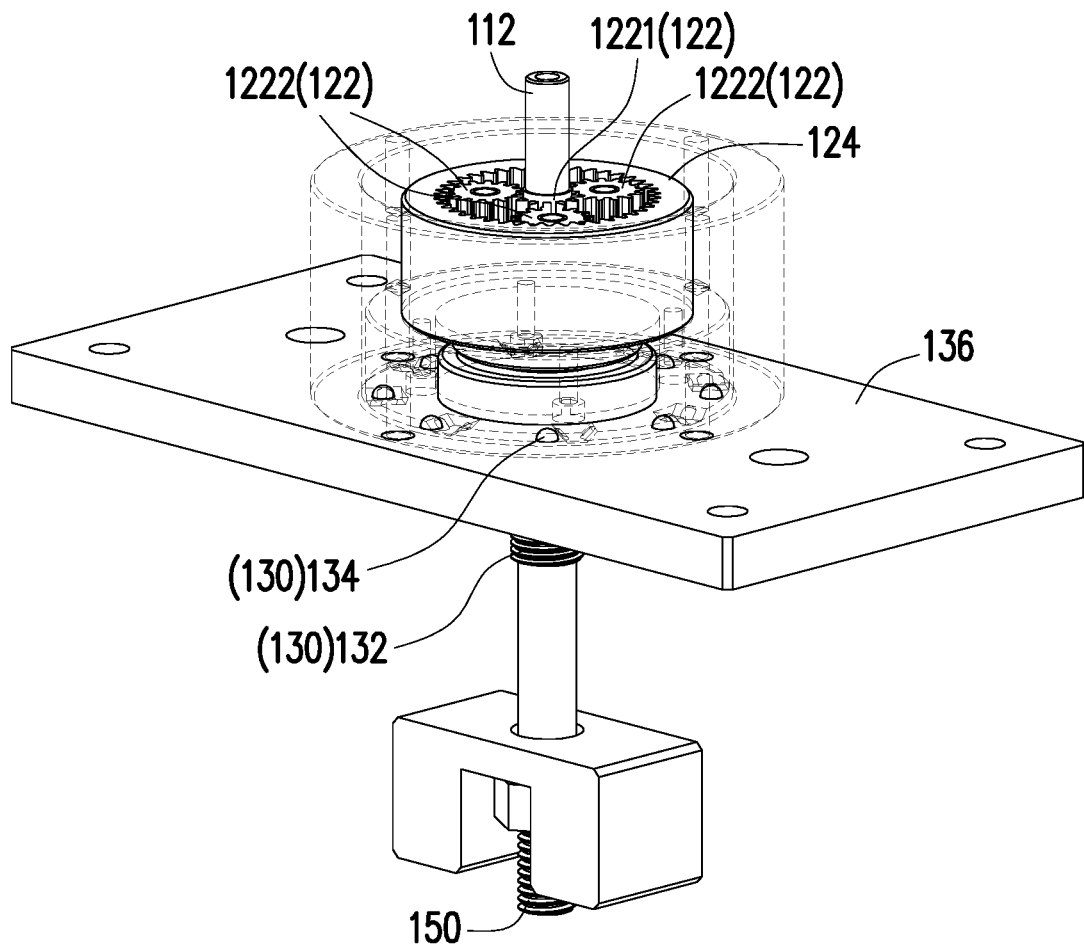
FIG. 3 is a schematic diagram of part of elements of a torsion adjustment device.

FIG. 3 is a schematic diagram of part of elements of a torsion adjustment device. Referring to FIGS. 2 and 3 at the same time, in some embodiments, the force transmission module 120 may include, as shown in FIG. 2, a gear set 122 and a gear turntable 124 meshing with the gear set 122. The transmission shaft 112 is coupled to the gear set 122 to drive the gear set 122 to rotate through the torsion provided by the torsion mechanism 10. The gear turntable 124 is sleeved outside the gear set 122 and is driven by the gear set 122 to rotate. Specifically, the gear set 122 may be an epicyclic gear set. That is, the gear set 122 may include a center gear 1221 (also called a sun gear) and a plurality of outer ring gears 1222 (also called planet gears). The center gear 1221 is coupled to the transmission shaft 112, so as to be driven by the transmission shaft 112 to rotate. The outer ring gears 1222 are disposed around the center gear 1221 and mesh with the center gear 1221, so as to be driven by the center gear 1221 to rotate. The gear turntable 124 may be sleeved outside the gear set 122 and mesh with the outer ring gears 1222.

Figure 4:
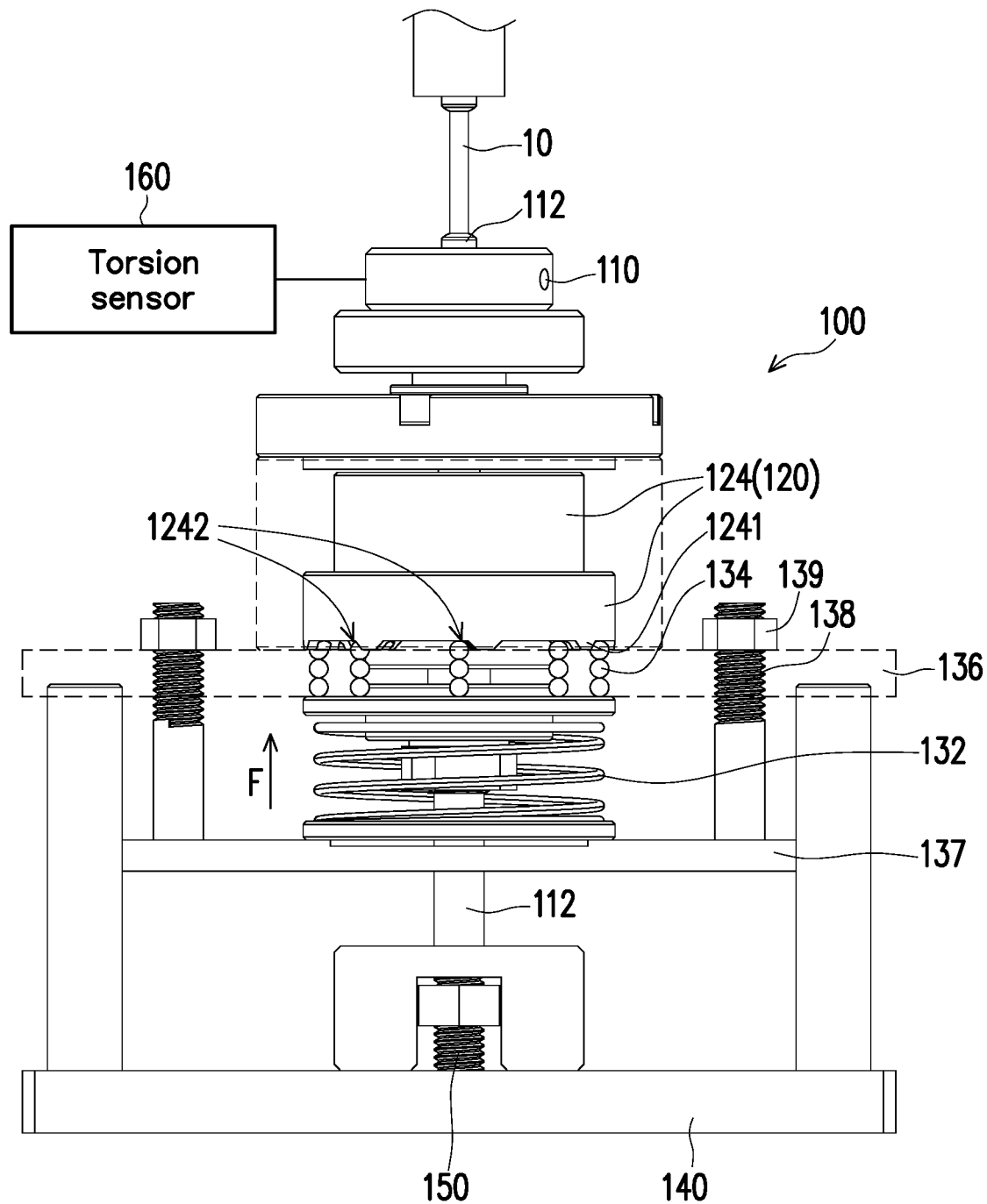
FIG. 4 is a side view diagram of a torsion adjustment device.
Figure 5:
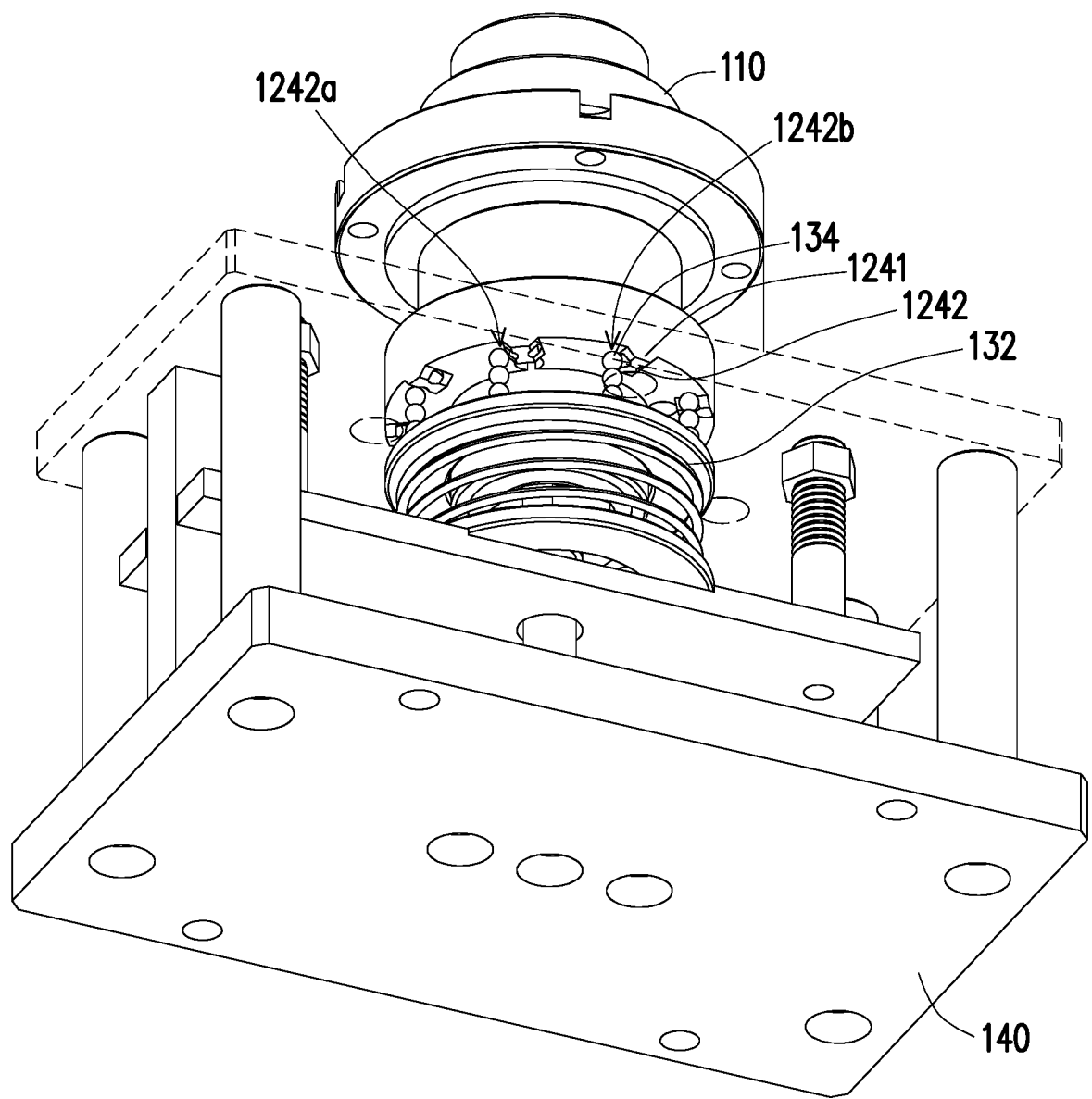
FIG. 5 is a partially enlarged schematic diagram of a torsion adjustment device.

FIG. 4 is a side view diagram of a torsion adjustment device, and FIG. 5 is a partially enlarged schematic diagram of a torsion adjustment device. Referring to FIGS. 4 and 5 at the same time, in some embodiments, the elastic force module 130 may include an elastic element 132 and a plurality of force-bearing balls 134. For example, the elastic element 132 may be a compression spring, and may generate an elastic force F under compression. The force-bearing ball 134 abuts between the elastic element 132 and the gear turntable 124 and mesh with the gear turntable 124. In such configuration, when a torsion provided (transmitted) by the transmission shaft 112 is substantially greater than the elastic force F generated by the elastic element 132, the gear turntable 124 may be disengaged from the force-bearing ball 134 and rotated. In the present embodiment, the force-bearing balls 134 may be three balls stacked, but the present disclosure is not limited thereto.

Specifically, the bottom of the gear turntable 124 may include a plurality of protrusions 1241, and the side surfaces of each of the protrusions 1241 have a plurality of grooves 1242 as shown in FIG. 5, so as to respectively mesh with the plurality of force-bearing balls 134. In other words, the protrusions 1241 protrude from the bottom of the gear turntable 124 to define the plurality of grooves 1242. In such structural configuration, when the gear set 122 is driven by the torsion of the transmission shaft 112 to rotate, the gear set 122 may simultaneously drive the gear turntable 124 to rotate. However, under the condition that the torsion of the transmission shaft 112 is substantially less than or equal to the elastic force F generated by the elastic element 132, the gear turntable 124 may be fixed at the original position and not rotated due to the meshing with the force-bearing ball 134, and then the torsion of the transmission shaft 112 may be transmitted via the gear turntable 124 to press the force-bearing ball 134, so that the force-bearing ball 134 is pressed to resist against the elastic force F of the elastic element 132. As the torsion applied by the transmission shaft 112 becomes larger and larger until it is substantially greater than the elastic force F generated by the elastic element 132, the gear turntable 124 having the protrusions 1241 is driven by the torsion to start to rotate, and the force-bearing ball 134 is driven by the protrusions 1241 to press the elastic element 132, and then the force-bearing ball 134 is disengaged from the grooves 1242. As a result, the gear turntable 124 is rotated and meshes with the next succeeding groove 1242.

In some embodiments, a plurality of grooves 1242a and 1242b may be respectively located on the side surfaces of the various protrusions 1241, as shown in FIG. 5. In other words, the protrusions 1241 may define a plurality of grooves 1242a and 1242b at the bottom of the gear turntable 124. In such structural configuration, when the torsion of the transmission shaft 112 is greater than the elastic force F of the elastic element 132 to enable the force-bearing ball 134 to be disengaged from one groove 1242a, the gear turntable 124 is rotated relative to the force-bearing ball 134 and moves till the force-bearing ball 134 meshes with another (the next succeeding) groove 1242b.

In some embodiments, the torsion adjustment device 100 may further include a torsion sensor 160 as shown in FIG. 4, which may be coupled to the transmission shaft 112 of the torsion receiving element 110 and used to sense the torsion of the transmission shaft 112. In some embodiments, the torsion sensor 160 also may be coupled to the torsion mechanism 10 to directly sense the torsion provided by the torsion mechanism 10. In such structural configuration, when the torsion applied by the transmission shaft 112 is substantially greater than the elastic force F generated by the elastic element 132 to cause the gear turntable 124 to rotate, a torsion value sensed by the torsion sensor 160 may have a relatively large change (skip), so that it can be known that the torsion currently applied by the transmission shaft 112 is greater than the elastic force F of the elastic element 132, and then the torsion provided by the torsion mechanism 10 may be calibrated and adjusted. In some embodiments, the torsion adjustment device 100 may include a controller which may be coupled to the torsion adjustment device 100 and the torsion mechanism 10. In such configuration, when the torsion of the transmission shaft 112 is substantially greater than the elastic force F of the elastic element 132 to cause the gear turntable 124 to rotate, the torsion sensor 160 may send a sensing signal to the controller, so that the controller may adjust and calibrate the torsion provided by the torsion mechanism 10 hereby. Therefore, the torsion adjustment device 100 of the present embodiment may easily know whether the torsion provided by the torsion mechanism 10 reaches a critical value without using an additional torsion meter, and may adjust and calibrate the torsion hereby (for example, the torsion, exceeding the critical value, of the torsion mechanism 10 is turned down), thereby simplifying the torsion adjustment and calibration process and then improving the torsion adjustment and calibration efficiency.

In some embodiments, the elastic force F generated by the elastic element 132 may be adjusted and controlled by the elastic force module 130 according to an actual requirement. For example, the elastic force module 130 may further include a bottom plate 137, a pressing plate 136 and a plurality of elastic force adjustment columns 138. The elastic element 132 may abut between the bottom plate 137 and the pressing plate 136, and the elastic force adjustment columns 138 are arranged on the bottom plate 137 and pass through the pressing plate 136 above. In such configuration, a distance between the bottom plate 137 and the pressing plate 136 may be adjusted through the elastic force adjustment columns 138. That is, a compression degree of the elastic element 132 compressed by the bottom plate 137 and the pressing plate 136 may be adjusted. Thus, the elastic force F generated by the elastic element 132 may be controlled and adjusted hereby.

For example, the elastic force module 130 may further include a plurality of nuts 139, and the elastic force adjustment columns 138 may be a plurality of studs correspondingly. In this way, the nuts 139 are respectively sleeved outside the studs and abut against the pressing plate 136, so as to adjust the distance between the bottom plate 137 and the pressing plate 136 by rotating the nuts 139. In the present embodiment, the torsion adjustment device 100 may further include a scale column 142 as shown in FIG. 1, which may be arranged on the base 140. Elastic force scales SC may be marked on the scale column 142. In this way, an operator may adjust the distance between the bottom plate 137 and the pressing plate 136 according to the elastic force scales SC to adjust the compression of the elastic element 132 hereby, and then a desired (preset) elastic force F is obtained. In this way, the operator may obtain the desired elastic force F by selecting an elastic element 132 with a proper elastic force coefficient at first and adjusting the distance between the bottom plate 137 and the pressing plate 136, in which the desired elastic force F may be considered as the critical value of the torsion, and then the torsion mechanism 10 may be butted with the torsion receiving element 110 to adjust and calibrate the torsion.

Based on the above, the torsion receiving element of the torsion adjustment device according to the embodiment of the present disclosure may be butted with the torsion mechanism to receive and transmit the torsion provided by the torsion mechanism and drive the transmission shaft thereof to rotate, so as to lock the rotatably locked assembly through the rotation. When the torsion transmitted by the transmission shaft is greater than the elastic force generated by the elastic element, the gear turntable is driven by the torsion to start to rotate, so that the force-bearing ball and the elastic element are pressed, and then the force-bearing ball is disengaged from the gear turntable. As a result, the gear turntable is rotated. In this way, the torsion adjustment device may determine whether a torsion value of the torsion mechanism reaches a preset critical value by the force-bearing ball of the elastic force module and the gear turntable of the force transmission module are in mesh or not, and then the torsion of the torsion mechanism may be adjusted and calibrated. Therefore, the torsion adjustment device of the embodiment of the present disclosure may easily know whether the torsion provided by the torsion mechanism reaches the critical value without using the additional torsion meter, and may adjust and calibrate the torsion hereby (for example, the torsion, exceeding the critical value, of the torsion mechanism is turned down), thus simplifying the torsion adjustment and calibration process and then improving the torsion adjustment and calibration efficiency.

Finally, it should be noted that the foregoing embodiments are merely intended to describe the technical solutions of the present disclosure, other than limit the present disclosure. Although the content of the present disclosure is described in detail with reference to the foregoing embodiments, persons of ordinary skill in the art should understand that they may still make modifications to the technical solutions described in the foregoing embodiments, or make equivalent substitutions to some or all the technical features thereof, and the modifications or substitutions do not make the nature of corresponding technical solutions depart from the scope of the technical solutions of the embodiments of the present disclosure.

What is claimed is:

1. A torsion adjustment device, used to adjust a torsion of a torsion mechanism, comprising:
   a torsion receiving element, comprising a transmission shaft coupled to the torsion mechanism, wherein the transmission shaft is driven by a torsion applied by the torsion mechanism to rotate;
   a force transmission module, comprising a gear set and a gear turntable meshing with the gear set, wherein the transmission shaft is coupled to the gear set to drive the gear set to rotate by the torsion; and
   an elastic force module, comprising an elastic element and a plurality of force-bearing balls, wherein the elastic element is configured to generate an elastic force, the plurality of force-bearing balls abut between the elastic element and the gear turntable and mesh with the gear turntable, and when the torsion is greater than the elastic force, the gear turntable is disengaged from the plurality of force-bearing balls and rotated.

2. The torsion adjustment device according to claim 1, wherein the gear set comprises a center gear and a plurality of outer ring gears, wherein the center gear is coupled to the transmission shaft and the plurality of outer ring gears mesh with the center gear; and the gear turntable is sleeved outside the gear set and meshes with the plurality of outer ring gears.

3. The torsion adjustment device according to claim 2, wherein the gear set is an epicyclic gear set, the center gear is a sun gear, and the outer ring gears are planet gears.

4. The torsion adjustment device according to claim 1, wherein the gear turntable comprises a plurality of grooves to respectively mesh with the plurality of force-bearing balls, and when the torsion is greater than the elastic force, the plurality of force-bearing balls press the elastic element to cause the plurality of force-bearing balls to be disengaged from the grooves.

5. The torsion adjustment device according to claim 1, wherein the elastic force module further comprises a bottom plate, a pressing plate and a plurality of elastic force adjustment columns, the elastic element abuts between the bottom plate and the pressing plate, the plurality of elastic force adjustment columns are arranged on the bottom plate and pass through the pressing plate to adjust a distance between the bottom plate and the pressing plate through the plurality of elastic force adjustment columns, so as to adjust the elastic force.

6. The torsion adjustment device according to claim 5, wherein the elastic force module also comprises a plurality of nuts, the plurality of elastic force adjustment columns are a plurality of studs, and the plurality of nuts are respectively sleeved outside the plurality of studs and abut against the pressing plate, so as to adjust the distance between the bottom plate and the pressing plate by rotating the nuts.

7. The torsion adjustment device according to claim 1, further comprising a rotatably locked assembly, wherein the transmission shaft is coupled to the rotatably locked assembly, so as to lock the rotatably locked assembly via rotation.

8. The torsion adjustment device according to claim 7, further comprising a base and a scale column arranged on the base, wherein the rotatably locked assembly is arranged on the base, and elastic force scales are marked on the scale column, so as to mark the elastic force.

9. The torsion adjustment device according to claim 1, wherein the elastic element is a compression spring.

10. The torsion adjustment device according to claim 1, further comprising a torsion sensor, coupled to the torsion receiving element to sense the torsion.

\* \* \* \* \*